(12) United States Patent
Hirata et al.

(10) Patent No.: US 7,312,951 B2
(45) Date of Patent: Dec. 25, 2007

(54) MAGNETIC HEAD FOR PERPENDICULAR MAGNETIC RECORDING

(75) Inventors: Kei Hirata, Tokyo (JP); Kiyoshi Noguchi, Tokyo (JP); Tetsuya Roppongi, Tokyo (JP); Atsushi Yamaguchi, Tokyo (JP)

(73) Assignee: TDK Corporation, Tokyo (JP)

( * ) Notice: Subject to any disclaimer, the term of this patent is extended or adjusted under 35 U.S.C. 154(b) by 354 days.

(21) Appl. No.: 11/038,390

(22) Filed: Jan. 21, 2005

(65) Prior Publication Data

US 2005/0286170 A1 Dec. 29, 2005

(30) Foreign Application Priority Data

Jun. 23, 2004 (JP) ............................ P2004-185437

(51) Int. Cl.
*G11B 5/127* (2006.01)
*G11B 5/147* (2006.01)
*G11B 5/133* (2006.01)
*G11B 5/33* (2006.01)

(52) U.S. Cl. ...................... 360/125; 360/126; 360/127; 428/812; 428/815.2

(58) Field of Classification Search ......... 360/125–127
See application file for complete search history.

(56) References Cited

U.S. PATENT DOCUMENTS

| | | | | |
|---|---|---|---|---|
| 4,687,712 A | * | 8/1987 | Sugita et al. ................ | 428/611 |
| 4,766,039 A | * | 8/1988 | Otomo et al. ................ | 428/469 |
| 4,858,049 A | * | 8/1989 | Kobayashi et al. .......... | 360/126 |
| 5,830,587 A | * | 11/1998 | Shukovsky et al. .......... | 428/682 |
| 6,034,847 A | * | 3/2000 | Komuro et al. .............. | 360/126 |
| 6,185,078 B1 | * | 2/2001 | Lin et al. ................ | 360/324.12 |
| 6,249,406 B1 | * | 6/2001 | Gill et al. .............. | 360/324.11 |
| 6,278,594 B1 | * | 8/2001 | Engel et al. ................ | 360/325 |
| 6,433,968 B1 | * | 8/2002 | Shi et al. ..................... | 360/317 |
| 6,436,200 B1 | * | 8/2002 | Kiyomiya et al. .......... | 148/121 |
| 6,490,127 B1 | * | 12/2002 | Sasaki ......................... | 360/126 |
| 6,618,223 B1 | * | 9/2003 | Chen et al. ................. | 360/126 |
| 6,678,125 B2 | * | 1/2004 | Nikitin et al. .............. | 360/317 |
| 6,791,794 B2 | * | 9/2004 | Honjo et al. ................ | 360/126 |
| 7,023,659 B2 | * | 4/2006 | Honjo et al. ................ | 360/126 |

(Continued)

FOREIGN PATENT DOCUMENTS

JP 02252111 A * 10/1990

(Continued)

*Primary Examiner*—Andrea Wellington
*Assistant Examiner*—Jason M. Garr
(74) *Attorney, Agent, or Firm*—Oliff & Berridge, PLC

(57) ABSTRACT

The invention provides a magnetic head for perpendicular magnetic recording having an air bearing surface positioned facing the recording surface of a recording medium, which records magnetic information on the recording medium by generating magnetic flux toward the recording surface of the recording medium, and comprises a magnetic pole which generates magnetic flux toward the recording surface of the recording medium and a return yoke having one end connected to the magnetic pole and the other end positioned facing the recording surface of the recording medium, wherein the material composing the magnetic pole has a magnetostriction constant $\lambda$ of at least 0 and less than $10\times10^{-6}$, with a parameter P represented by the formula: $P=Hk/(\lambda\times\sigma)$ (where Hk represents the magnetic anisotropic field (A/m), $\sigma$ represents the stress (MPa) and $\lambda$ represents the magnetostriction constant) of larger than 0.1 and less than 200.

18 Claims, 7 Drawing Sheets

U.S. PATENT DOCUMENTS

| | | | |
|---|---|---|---|
| 7,166,376 B2* | 1/2007 | Hikosaka et al. | 428/829 |
| 2001/0028917 A1* | 10/2001 | Sasaki | 427/130 |
| 2001/0036043 A1* | 11/2001 | Oikawa et al. | 360/317 |
| 2003/0017362 A1* | 1/2003 | Minor et al. | 428/692 |
| 2003/0058576 A1* | 3/2003 | Honjo et al. | 360/126 |
| 2003/0235716 A1* | 12/2003 | Kim et al. | 428/694 TM |
| 2004/0021985 A1 | 2/2004 | Pokhil et al. | |
| 2004/0080868 A1* | 4/2004 | Yamaguchi et al. | 360/126 |
| 2004/0150912 A1 | 8/2004 | Kawato et al. | |
| 2004/0190198 A1* | 9/2004 | Honjo et al. | 360/126 |
| 2004/0224184 A1* | 11/2004 | Hikosaka et al. | 428/694 TM |
| 2005/0018347 A1* | 1/2005 | Hsiao et al. | 360/128 |
| 2005/0047017 A1* | 3/2005 | Mei et al. | 360/234.7 |
| 2005/0271904 A1* | 12/2005 | Li et al. | 428/842.1 |
| 2006/0119982 A1* | 6/2006 | Honjo et al. | 360/126 |
| 2006/0275628 A1* | 12/2006 | Chen et al. | 428/827 |

FOREIGN PATENT DOCUMENTS

| | | |
|---|---|---|
| JP | A 07-86035 | 3/1995 |
| JP | A 07-086038 | 3/1995 |
| JP | A 09-082522 | 3/1997 |
| JP | A 2003-296906 | 10/2003 |
| JP | A 2004-71139 | 3/2004 |
| JP | A 2004-281023 | 10/2004 |

* cited by examiner

MAGNETIC HEAD FOR PERPENDICULAR MAGNETIC RECORDING

BACKGROUND OF THE INVENTION

1. Field of the Invention

The present invention relates to a magnetic head for perpendicular magnetic recording, for use in a perpendicular magnetic recording-type magnetic recording device.

2. Related Background Art

High densification of recording media for magnetic recording devices is achieved using perpendicular magnetic recording systems wherein magnetic information is recorded in the direction perpendicular to the recording surfaces of the recording media, and magnetic heads for perpendicular magnetic recording are employed for the recording on the recording media.

Recording media for perpendicular magnetic recording systems include double-layer recording media comprising a recording layer and a soft magnetic back layer, and single-layer recording media having no back layer. When using a double-layer recording medium, it is necessary to carry out magnetic recording on the recording medium using a magnetic head which comprises a magnetic pole and a return yoke.

To achieve higher recording density, on the other hand, it is preferred to increase not only the linear recording density of the recording medium, but also to narrow the width of the pole tip to increase the track density. However, when the pole tip is narrowed, remanent magnetization occurs as a result of shape anisotropy at the magnetic pole, and therefore when magnetic information is recorded in the recording medium using the recording head, the magnetization recorded in the recording medium is erased by the remanent magnetic field arising from the remanent magnetization, resulting in the problem of erasure of the magnetic information, or "pole erasure". It is ordinarily thought that the problem of pole erasure is attributed to the increased influence of shape anisotropy at the pole tip when the width of the pole tip is narrowed.

In order to eliminate the problem of pole erasure, there has been proposed a magnetic head having a main magnetic pole with a constricted section in which the cross-sectional area parallel to the air bearing surface (the side facing the recording surface of the recording medium) decreases toward the air bearing surface CABS), the structure being such that the ratio between the distance from the position of the constricted section nearest the air bearing surface to the main magnetic pole air bearing surface and the area of the main magnetic pole air bearing surface is larger than 0 and smaller than 0.002 [nm$^{-1}$] (see Japanese Unexamined Patent Publication No. 2003-296906).

It is noted that uniaxial magnetic anisotropy thin-films or magnetic thin-films are disclosed in Japanese Unexamined Patent Publication HEI No. 7-86035, Japanese Unexamined Patent Publication HEI No. 9-82522 and Japanese Unexamined Patent Publication HEI No. 7-86038.

SUMMARY OF THE INVENTION

The present inventors have found that the magnetic head described in the aforementioned Japanese Unexamined Patent Publication No. 2003-296906 does not allow adequate prevention of pole erasure for recording onto recording media.

It is an object of the present invention to provide a magnetic head for perpendicular magnetic recording which allows adequate prevention of pole erasure, which would otherwise occur on recording onto recording media.

In order to solve the problem described above, the invention provides a magnetic head for perpendicular magnetic recording having an air bearing surface positioned facing the recording surface of a recording medium, which records magnetic information on the recording medium by generating magnetic flux toward the recording surface of the recording medium, the magnetic head comprising a magnetic pole which generates magnetic flux toward the recording surface of the recording medium, and a return yoke connected to the magnetic pole, wherein the magnetic pole has a pole tip provided at the air bearing surface side and a yoke section provided at the opposite side of the pole tip from the air bearing surface side, and wherein the material composing the magnetic pole has a magnetostriction constant $\lambda$ of at least 0 and less than $10\times10^{-6}$, with a parameter P represented by the following formula:

$$P = \frac{H_k}{\left(\frac{|\lambda|}{10^{-6}}\right)\times|\sigma|} \quad (1)$$

(wherein $H_k$ represents the magnetic anisotropic field of the material (units: A/m), $\sigma$ represents the stress of the material (units: MPa) and $\lambda$ represents the magnetostriction constant of the material) of larger than 0.1 and less than 200.

This magnetic head for perpendicular magnetic recording is mounted in a magnetic recording device to allow adequate prevention of pole erasure for recording of magnetic information on a recording medium.

If the parameter P represented by the formula shown above is 0.1 or smaller, the influence of the magnetoelastic effect will increase, resulting in an unstable magnetic domain structure at the yoke section and tending to occur pole erasure. On the other hand, if the parameter P is 200 or larger, it will not be possible to sufficiently saturate the magnetic pole in the magnetic field generated by the coil, thus risking inadequate recording power.

In this magnetic head for perpendicular magnetic recording, preferably the magnetic anisotropic field $H_k$ of the material is at least 800 A/m and no larger than 20,000 A/m, while the stress $\sigma$ is at least 100 MPa and no larger than 1000 MPa. According to the invention, a positive value for the stress $\sigma$ means that the stress is a tensile stress, while a negative value for the stress $\sigma$ means that the stress is a compressive stress.

If the magnetic anisotropic field $H_k$ of the material is less than 800 A/m, the magnetic domain structure will tend to be more unstable than when the magnetic anisotropic field $H_k$ is 800 A/m or larger, while if the magnetic anisotropic field $H_k$ is larger than 20,000 A/m, it will not be possible to sufficiently saturate the magnetic pole in the magnetic field generated by the coil, thus risking inadequate recording power, as opposed to when the magnetic anisotropic field $H_k$ is 20,000 A/m or smaller. If the stress $\sigma$ is less than 100 MPa, the effect of the tensile stress at the pole tip will be reduced, tending to occur pole erasure at the pole tip, as opposed to when the stress $\sigma$ is 100 MPa or larger. If the stress $\sigma$ is larger than 1000 MPa; delamination of the pole tip may occur, as opposed to when the stress $\sigma$ is 1000 MPa or smaller.

The present invention further provides a magnetic head for perpendicular magnetic recording having an air bearing surface positioned facing the recording surface of a recording medium, which records magnetic information on the recording medium by generating magnetic flux toward the recording surface of the recording medium, the magnetic head comprising a magnetic pole which generates magnetic flux toward the recording surface of the recording medium, and a return yoke connected to the magnetic pole, wherein the magnetic pole has a pole tip provided at the air bearing surface side and a yoke section provided at the opposite side of the pole tip from the air bearing surface side, and wherein the material composing the magnetic pole has a magnetostriction constant λ of at least $10 \times 10^{-6}$ and no larger than $60 \times 10^{-6}$, with a parameter P represented by the following formula:

$$P = \frac{H_k}{\left(\frac{|\lambda|}{10^{-6}}\right) \times |\sigma|} \quad (1)$$

(wherein Hk represents the magnetic anisotropic field of the material (units: A/m), σ represents the stress of the material (units: MPa) and λ represents the magnetostriction constant of the material) of 0.2 or larger and less than 20.

This magnetic head for perpendicular magnetic recording is mounted in a magnetic recording device to allow adequate prevention of pole erasure for recording of magnetic information on a recording medium with the air bearing surface facing the recording surface.

If the parameter P represented by the formula shown above is less than 0.2, the influence of the magnetoelastic effect will increase, resulting in an unstable magnetic domain structure at the yoke section and tending to occur pole erasure. On the other hand, if the parameter P is 20 or larger, it will not be possible to sufficiently saturate the magnetic pole in the magnetic field generated by the coil, thus risking inadequate recording power.

In this magnetic head for perpendicular magnetic recording, preferably the magnetic anisotropic field Hk of the material is at least 2000 A/m and no larger than 25,000 A/m, while the stress σ is at least 100 MPa and no larger than 1000 MPa.

If the magnetic anisotropic field Hk of the material is less than 2000 A/m, the magnetic domain structure will tend to be more unstable than when the magnetic anisotropic field Hk is 2000 A/m or larger, while if the magnetic anisotropic field Hk is larger than 25,000 A/m, it will not be possible to sufficiently saturate the magnetic pole in the magnetic field generated by the coil, thus risking inadequate recording power, as opposed to when the magnetic anisotropic field Hk is 25,000 A/m or smaller. If the stress σ is less than 100 MPa, the effect of the tensile stress at the pole tip will be reduced, tending to occur pole erasure at the pole tip, as opposed to when the stress σ is 100 MPa or larger. If the stress σ is larger than 1000 MPa, delamination of the pole tip may occur, as opposed to when the stress σ is 1000 MPa or smaller.

The saturation flux density at the magnetic pole of the magnetic head for perpendicular magnetic recording is preferably 1.5 (Wb/m$^2$) or larger.

If the saturation flux density is less than 1.5 (Wb/m$^2$), the generation of flux will be insufficient to achieve saturated recording of the recording medium from the magnetic pole, tending to result in inadequate recording power.

The magnetic pole of the magnetic head for perpendicular magnetic recording is fixed on a flat plane, and the thickness of the magnetic pole is preferably 0.15-0.4 μm.

If the magnetic pole thickness is less than 0.15 μm, the magnetic pole will tend to have an island magnetic domain or single magnetic domain structure and a stable magnetic domain structure will not be easily formed, thus tending to result in pole erasure, as opposed to when the magnetic pole thickness is 0.15 μm or larger. If the magnetic pole thickness is larger than 0.4 μm, the erase band will be larger on the surrounding tracks when recording magnetic information at a skew angle with respect to the recording medium, thereby tending to decrease the track density. If the plate-like magnetic pole is not fixed on the flat plane of the aforementioned members, formation of a stable magnetic domain structure will be inhibited by recesses and protrusions in the magnetic pole, thereby possibly forming an unstable magnetic domain structure.

In the magnetic head for perpendicular magnetic recording, the ratio of the width W of the pole tip determining the track width and the length L along the direction perpendicular to the air bearing surface of the pole tip (L/W) is preferably at least 0.5 and no larger than 3.

If this ratio is less than 0.5, pole erasure will not notably occur and the superiority of the present invention will not be apparent. If the ratio is larger than 2, the magnetic flux generated from the magnetic pole will be reduced, possibly resulting in reduced recording power.

In the magnetic head for perpendicular magnetic recording, the ratio of the maximum width YW at the yoke section and the maximum length YL along the direction perpendicular to the air bearing surface of the magnetic pole (YL/YW) is preferably at least 0.33 and no larger than 3.

If this ratio is less than 0.33, the effect of shape anisotropy in the transverse direction, i.e. the direction parallel to the air bearing surface, will be dominant and the superiority of the present invention in stabilizing the magnetic domain structure will not be apparent. If the ratio is larger than 3, the effect of shape anisotropy in the height direction, i.e. the direction orthogonal to the air bearing surface, will be dominant, tending to inhibit stabilization of the magnetic domain structure.

In the magnetic head for perpendicular magnetic recording, the 180° domain wall at the yoke section is preferably parallel to the air bearing surface.

In this case, the magnetic head for perpendicular magnetic recording may be mounted in the magnetic recording device and magnetic information may be recorded in the recording medium to allow pole erasure to be more adequately prevented.

In the magnetic head for perpendicular magnetic recording, preferably the material composing the magnetic pole comprises $(Fe_xCo_{1-x})_{1-Y}A_Y$ or $(Fe_xCo_{1-x})_{1-Y}(A_WB_{1-W})_Y$, where X, Y and W satisfy the following inequalities:

$0.5 \leq X \leq 1$ $0 \leq Y \leq 0.1$ $0 \leq W \leq 0.5$, wherein the element for A is selected from the group consisting of B, C, N, Al, Si, Ni, Cu, Zr, Hf and Ta, and wherein the element for B is selected from the group consisting of O, N and C.

This provides the advantage of further increasing the saturation magnetic flux density and allowing more adequate recording power to be ensured, compared to cases where the material does not have such a construction.

Particularly preferred among these materials for the magnetic pole are $Co_{0.3}Ni_{0.2}Fe_{0.5}$, $Fe_{0.95}Ni_{0.05}$, $(Fe_{0.7}Co_{0.3})_{0.95}B_{0.05}$, $(Fe_{0.7}Co_{0.3})_{0.95}(Zr_{0.33}O_{0.67})_{0.05}$, $(Fe_{0.7}Co_{0.3})_{0.96}(Zr_{0.33}O_{0.67})_{0.04}$ and $Fe_{0.6}Co_{0.36}Ni_{0.04}$. These materials may be used to form the magnetic pole in order to allow pole erasure to be more reliably prevented.

The magnetic head for perpendicular magnetic recording of the invention can adequately prevent pole erasure from occurring during recording onto a recording medium.

DETAILED DESCRIPTION OF THE PREFERRED EMBODIMENTS

Preferred embodiments of the magnetic head for perpendicular magnetic recording of the invention will now be explained in detail.

First Embodiment

Figure 1:
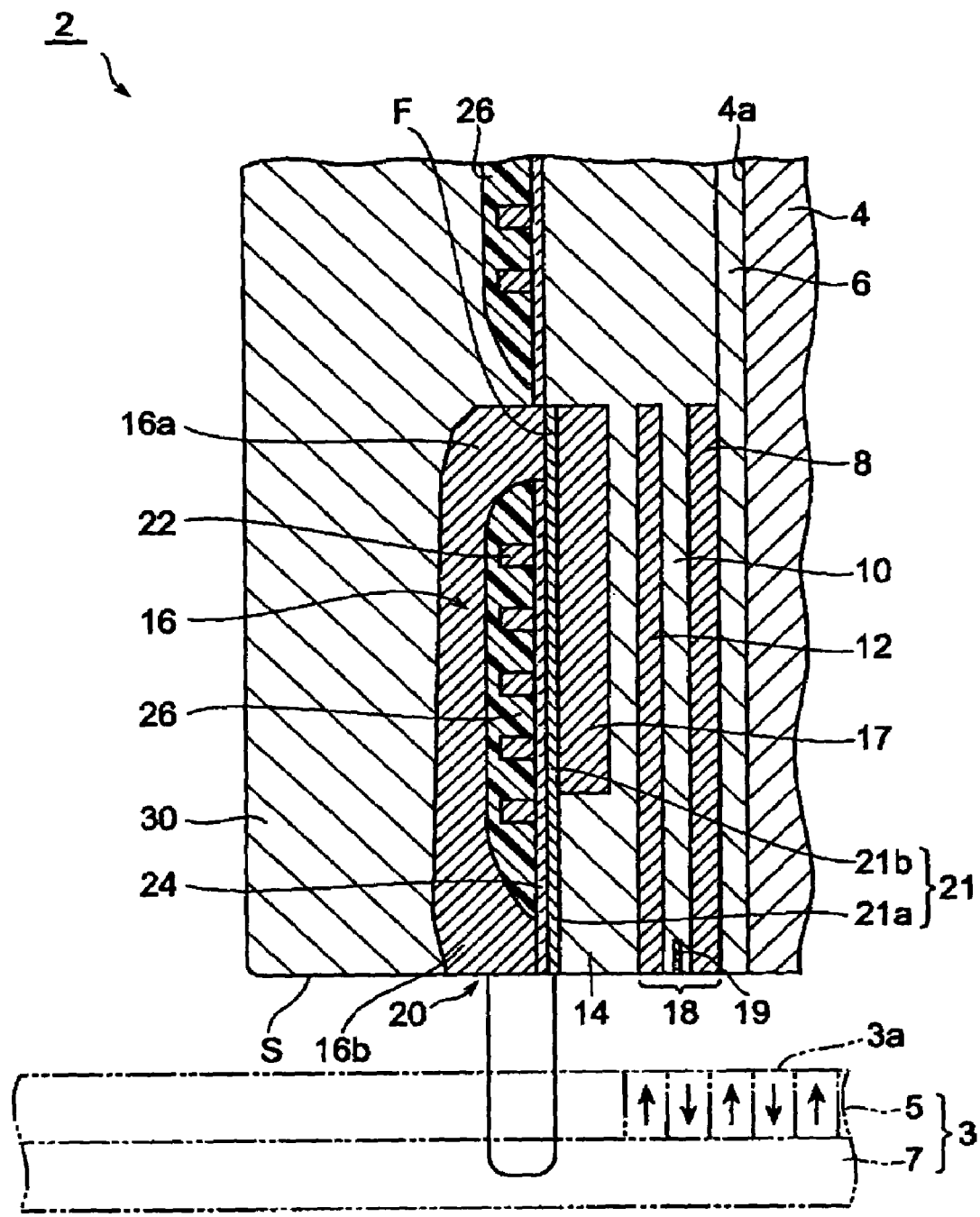
FIG. 1 is a cross-sectional view of an embodiment of a magnetic head for perpendicular magnetic recording according to the invention.

FIG. 1 is a cross-sectional view of an embodiment of a magnetic head for perpendicular magnetic recording according to the invention.

As shown in FIG. 1, the magnetic head 2 for perpendicular magnetic recording is positioned facing the recording medium 3. The recording medium 3. comprises a recording layer 5 having a recording surface 3a, and a soft magnetic back layer 7 laminated on the recording layer 5. More specifically, the magnetic head 2 for perpendicular magnetic recording is positioned on the recording surface 3a side of the recording medium 3.

The magnetic head 2 for perpendicular magnetic recording has a substrate 4 made of, for example, $Al_2O_3 \cdot TiC$, and also has an air bearing surface S orthogonal to one side 4a of the substrate 4 and positioned facing the recording surface 3a of the recording medium 3. On the air bearing surface S side of the magnetic head 2 there are laminated on the one side 4a of the substrate 4, in order, an insulating layer 6 made of alumina, for example, a reproduction head section 18 which reads the signal in the recording layer 5 of the recording medium 3 and reproduces the information recorded in the recording layer 5, an insulating layer 14 made of alumina, for example, a recording head section 20 which generates magnetic flux toward the recording surface 3a of the recording medium 3 to record magnetic information in the recording layer 5, and an insulating layer 30 made of alumina, for example.

The reproduction head section 18 is constructed with a read shield layer 8, an insulating layer 10 made of alumina, for example, and a read shield layer 12 laminated in that order on the insulating layer 6. On the air bearing surface S side of the insulating layer 10 there is provided an MR element 19 exposed to the recording surface 3a of the recording medium 3. The MR element 19 is an element which can detect changes in the magnetic field of the recording layer 5 at high sensitivity when the magnetic head 2 is moved relative to the recording surface 3a, and generate an electric current in response. Such an MR element 19 may be, for example, a GMR element which utilizes a giant magneto-resistance effect, or a TMR element which utilizes the tunnel magneto-resistance effect.

The recording head section 20 comprises a magnetic pole layer 21, a yoke layer 17 provided on the insulating layer 14 side of the magnetic pole layer 21, an insulating layer 24 provided on the side of the magnetic pole layer opposite the yoke layer 17 side, a coil 22 provided on the insulating layer 24, an insulating layer 26 provided on the insulating layer 24 covering the coil 22, and a return yoke 16 provided on the insulating layer 26.

The coil 22 has a coiled structure wound around one end 16a of the return yoke 16 as the core, and the return yoke 16 is provided on the insulating layer 26 which, together with the magnetic pole layer 21, sandwiches the coil 22. The other end 16b of the return yoke 16 is exposed to the recording surface 3a of the recording medium 3 at the air bearing surface S side, while the one end 16a passes through the insulating layer 24 and is directly connected to the magnetic pole layer 21. One end of the magnetic pole layer 21 is also exposed to the recording surface 3a of the recording medium 3 at the air bearing surface S side. Thus, when a current flows through the coil 22, magnetic flux is generated from the magnetic pole layer 21 toward the recording surface 3a of the recording medium 3. This magnetic flux passes through the recording layer 5, back layer 7 and recording layer 5 of the recording medium 3, enters the return yoke 16 and returns to the magnetic pole layer 21.

The yoke layer 17 and insulating layer 14 are linked to form a flat surface F, and the magnetic pole layer 21 is anchored on the flat surface F extending from the yoke layer 17 to the insulating layer 14.

Figure 2:
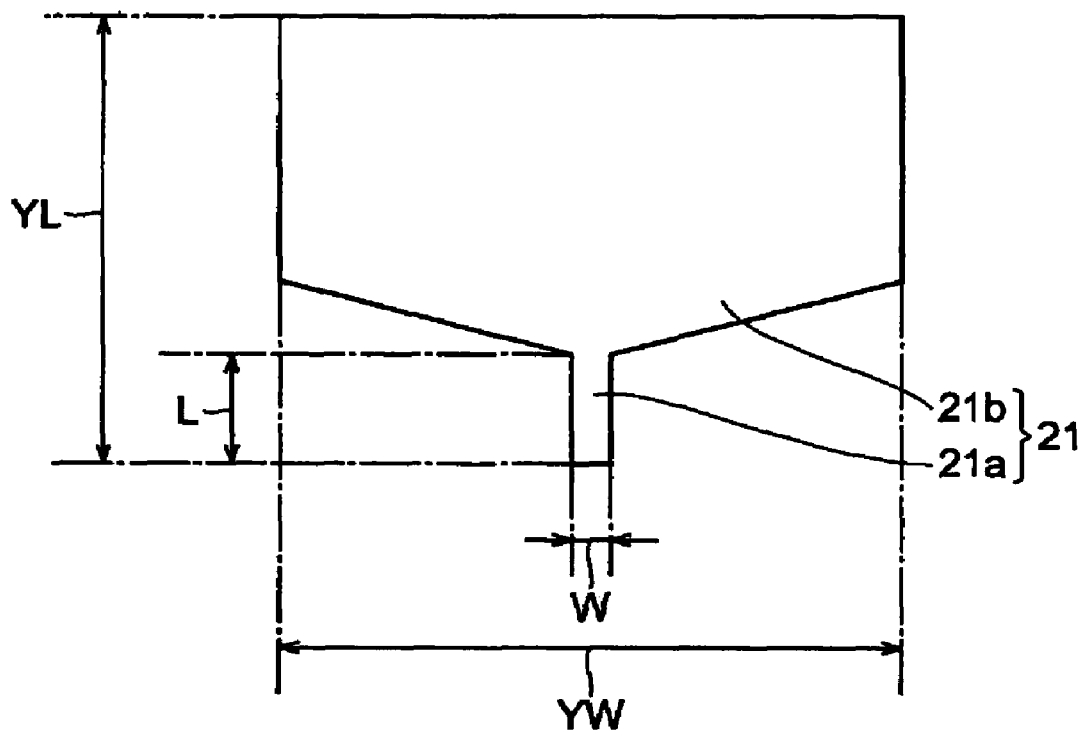
FIG. 2 is a front view showing the magnetic pole of FIG. 1.

FIG. 2 is a front view showing the magnetic pole 21 of FIG. 1. As shown in FIG. 2, the magnetic pole layer 21 comprises a pole tip 21a provided on the air bearing surface S side of the magnetic head 2 and extending in the direction perpendicular to the air bearing surface S, and a yoke section 21b provided on the side of the pole tip 21a opposite the air bearing surface S. A yoke layer 17 is laminated on the yoke section 21b, while one end 16a of the return yoke 16 is connected thereto. The yoke section 21b has a gradually increasing width with greater distance from the air bearing surface S of the pole tip 21a, but the width is constant upon reaching a certain value.

The magnetic pole layer 21 has magnetic uniaxial anisotropy in the plane orthogonal to the thickness direction, and the soft magnetic material composing the magnetic pole layer 21 has a magnetostriction constant λ of at least 0 and less than 10×10⁻⁶, with a parameter P represented by the following formula:

$$P = \frac{H_k}{\left(\frac{|\lambda|}{10^{-6}}\right) \times |\sigma|} \quad (1)$$

(wherein Hk represents the magnetic anisotropic field of the soft magnetic material (units: A/m), σ represents the stress of the soft magnetic material (units: MPa) and λ represents the magnetostriction constant of the soft magnetic material) of larger than 0.1 and less than 200.

The soft magnetic material composing the magnetic pole layer 21 is not particularly restricted so long as the parameter P is larger than 0.1 and less than 200, and the soft magnetic material used preferably comprises $(Fe_XCo_{1-X})_{1-Y}A_Y$ or $(Fe_XCo_{1-X})_{1-Y}(A_WB_{1-W})_Y$. For this embodiment, the pole tip 21a and yoke section 21b of the magnetic pole layer 21 are composed of the same material.

In these chemical formulas, X, Y and W satisfy the following inequalities:

$0.5 \leq X \leq 1$ $0 \leq Y \leq 0.1$ $0 \leq W \leq 0.5$.

The element for A is selected from the group consisting of B, C, N, Al, Si, Ni, Cu, Zr, Hf and Ta, and the element for B is selected from the group consisting of O, N and C.

The soft magnetic material used may be, specifically, $Co_{0.3}Ni_{0.2}Fe_{0.5}$, $Fe_{0.95}Ni_{0.05}$, $(Fe_{0.7}Co_{0.3})_{0.95}B_{0.05}$, $(Fe_{0.7}Co_{0.3})_{0.95}(Zr_{0.33}O_{0.67})_{0.05}$, $(Fe_{0.7}Co_{0.3})_{0.96}(Zr_{0.33}O_{0.67})_{0.04}$, $Fe_{0.6}Co_{0.36}Ni_{0.04}$, or the like.

However, the element for A and the element for B may be any element besides those elements mentioned above so long as parameter P is larger than 0.1 and less than 200. In such cases as well, the pole erasure can be adequately prevented when the magnetic head 2 is used to record magnetic information on the recording layer 5 of the recording medium 3.

The function of the magnetic head for perpendicular magnetic recording 2 described above will now be explained.

The magnetic head 2 for perpendicular magnetic recording is positioned facing the recording medium 3. Specifically, the magnetic head 2 for perpendicular magnetic recording is positioned such that its air bearing surface S is positioned facing the recording surface 3a of the recording medium 3. A current flows through the coil 22 when magnetic information is recorded on the recording medium 3. This generates magnetic flux around the coil 22, and the magnetic flux is generated from the pole tip 21a of the magnetic pole layer 21 toward the recording surface 3a of the recording medium 3. The magnetic flux passes through the recording layer 5, back layer 7 and recording layer 5 of the recording medium 3, enters the return yoke 16 and returns to the magnetic pole layer 21. Magnetization is produced in the direction perpendicular to the recording surface 3a in the recording layer 5 of the recording medium 3. When the recording medium 3 is rotated, magnetization is successively produced in the recording layer 5 of the recording medium 3. In this manner, magnetic information is recorded in the recording layer 5 of the recording medium 3.

Since the magnetic pole layer 21 is constructed in the manner explained above, it is possible to adequately prevent erasure of the magnetization produced in the recording layer 5 as described above, or in other words, pole erasure. According to this magnetic head 2, therefore, it is possible to adequately prevent erasure of magnetic information and thus increase the reliability of the Hard Disk Drive in which the magnetic head 2 is mounted.

In the magnetic head 2 for perpendicular magnetic recording, the magnetic pole layer 21 is in a layer form, and is fixed on the flat surface F formed by the insulating layer 14 and yoke layer 17. Consequently, it is possible to prevent a condition in which an unstable magnetic domain structure is formed by recesses and protrusions in the magnetic pole layer 21 and an unstable magnetic domain structure is formed. As a result, pole erasure during recording of magnetic information is more adequately prevented than when the magnetic polar layer 21 is fixed to the a non-flat surface.

In the magnetic pole layer 21, the magnetic anisotropic field Hk is at least 800 A/m and no larger than 20,000 A/m, while the stress σ is at least 100 MPa and no larger than 1000 MPa.

If the magnetic anisotropic field Hk of the soft magnetic material composing the magnetic pole layer 21 is less than 800 A/m, the magnetic domain structure will tend to be more unstable than when the magnetic anisotropic field Hk is 800 A/m or larger, while if the magnetic anisotropic field Hk is larger than 20,000 A/m, it will not be possible to sufficiently saturate the magnetic pole in the magnetic field generated by the coil, thus risking inadequate recording power, as opposed to when the magnetic anisotropic field Hk is 20,000 A/m or smaller. If the stress σ of the soft magnetic material composing the magnetic pole layer 21 is less than 100 MPa, the effect of the tensile stress at the pole tip 21a will be reduced, tending to occur pole erasure at the pole tip 21a, as opposed to when the stress σ is 100 MPa or larger. If the stress σ is larger than 1000 MPa, delamination of the pole tip 21a may occur, as opposed to when the stress σ is 1000 MPa or smaller.

The magnetic anisotropic field Hk is preferably at least 800 A/m and no larger than 15,000 A/m. The stress σ is preferably at least 150 MPa and no larger than 800 MPa.

The saturation flux density of the soft magnetic material composing the magnetic pole layer 21 is preferably 1.5 (Wb/m²) or larger, and more preferably 1.8 (Wb/m²) or larger. If the saturation flux density of the soft magnetic material composing the magnetic pole layer 21 is less than 1.5 (Wb/m²), the generation of flux will be insufficient to achieve saturated recording of the recording medium 3 from the magnetic pole layer 21, tending to result in inadequate recording power.

The thickness of the magnetic pole layer 21 is preferably 0.15-0.4 μm. If the thickness of the magnetic pole layer 21 is less than 0.15 μm, the magnetic pole layer 21 will tend to have an island magnetic domain or single magnetic domain structure and a stable magnetic domain structure will not be easily formed, thus tending to result in pole erasure, as opposed to when the thickness of the magnetic pole layer 21 is 0.15 μm or larger. If the thickness of the magnetic pole layer 21 is larger than 0.4 μm, the erase band will be larger on the surrounding tracks when recording magnetic information at a skew angle with respect to the recording medium 3, thereby tending to decrease the track density of the recording medium 3.

The ratio of the length L along the direction perpendicular to the air bearing surface S of the pole tip 21a and the width W (L/W) is preferably at least 0.5 and no larger than 3.

According to this embodiment, the "width" is the length along the direction of the crossline between the air bearing surface S and the magnetic pole layer 21.

If this ratio is less than 0.5, pole erasure will not notably occur and the superiority of the magnetic head 2 will not be apparent. If the ratio is larger than 2, the magnetic flux generated from the magnetic pole layer 21 will be reduced, possibly resulting in reduced recording power.

The ratio of the maximum width YW at the yoke section 21b and the maximum length YL along the direction perpendicular to the air bearing surface S of the magnetic pole layer 21 (YL/YW) is preferably at least 0.33 and no larger than 3.

If this ratio is less than 0.33, the effect of shape anisotropy in the transverse direction, i.e. the direction parallel to the air bearing surface S, will be dominant and the superiority of the magnetic head 2 in stabilizing the magnetic domain structure will not be apparent. If the ratio is larger than 3, the effect of shape anisotropy in the height direction, i.e. the direction orthogonal to the air bearing surface S, will be dominant, tending to inhibit stabilization of the magnetic domain structure.

Figure 3:
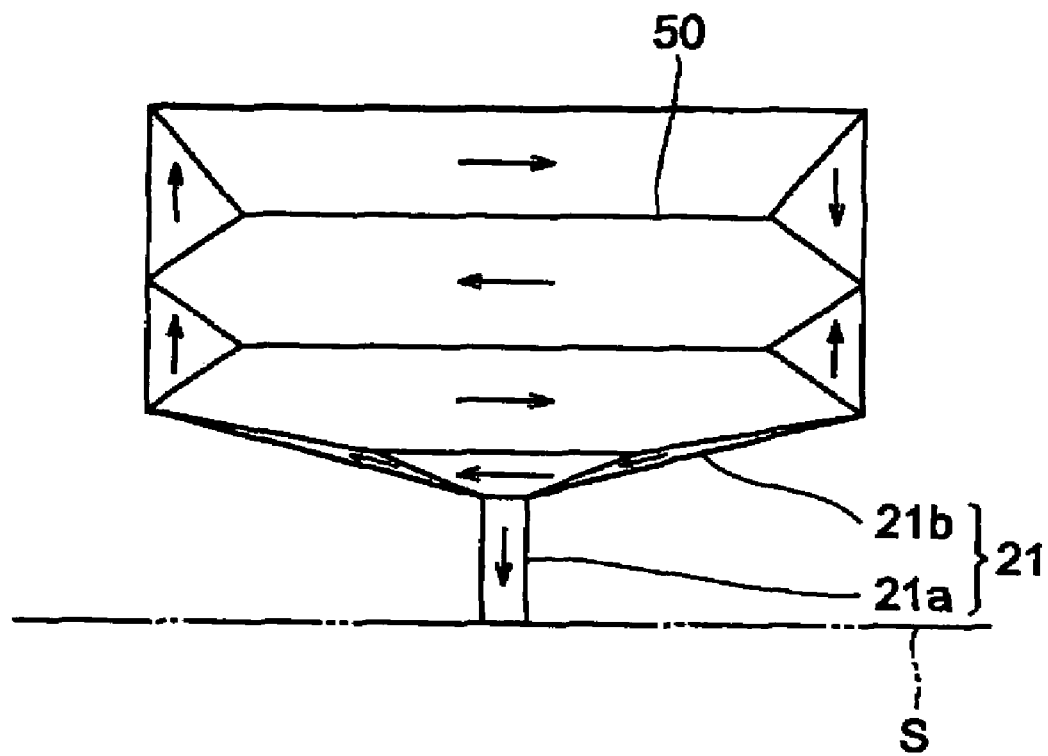
FIG. 3 is a drawing showing the magnetic domain structure of the magnetic pole of FIG. 2.

The 180° domain wall 50 at the yoke section 21b of the magnetic pole layer 21 is preferably parallel to the air bearing surface S, as shown in FIG. 3. In this case, pole erasure can be more adequately prevented when the magnetic head for perpendicular magnetic recording 2 is mounted in the magnetic recording device and magnetic information is recorded in the recording medium 3.

Second Embodiment

A second embodiment of the magnetic head for perpendicular magnetic recording of the invention will now be explained. Throughout the explanation of this embodiment, structural elements identical or corresponding to those of the first embodiment will be indicated using like reference numerals, and will not be explained again.

Figure 4:
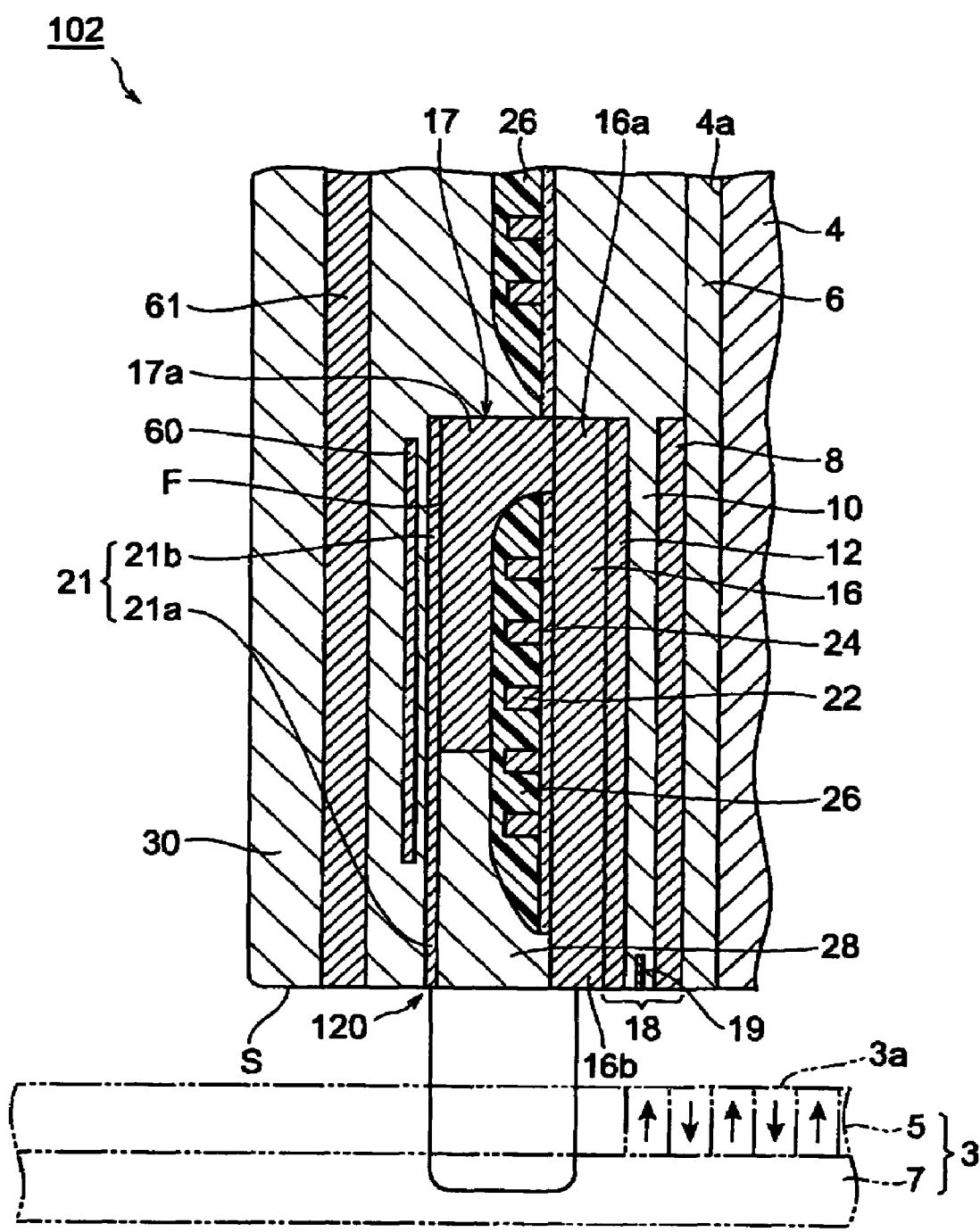
FIG. 4 is a cross-sectional view of another embodiment of a magnetic head for perpendicular magnetic recording according to the invention.

FIG. 4 is a cross-sectional view of a second embodiment of a magnetic head for perpendicular magnetic recording according to the invention. As shown in FIG. 4, the magnetic head 102 for perpendicular magnetic recording of this embodiment differs from the magnetic head 2 for perpendicular magnetic recording of the first embodiment in that the recording head section 120 has the construction described below.

Specifically, the recording head section 120 comprises a return yoke 16 provided adjacent to a read shield layer 12 on the air bearing surface S side. An insulating layer 24 is formed on the return yoke 16, and a coil 22 is provided on the insulating layer 24, with the coil 22 covered by the insulating layer 26. A yoke layer 17 is provided on the insulating layer 26. Also, an insulating layer 28 forming the flat surface F together with the yoke layer 17 is provided adjacent to the yoke layer 17 on the insulating layer 26. The insulating layer 28 is made of alumina, for example. The magnetic pole layer 21 is formed on the flat surface F. The magnetic pole layer 21 covers the entire portion of the flat surface F which is the flat surface of the yoke layer 17.

The coil 22 has a coiled structure wound around one end 17a of the yoke layer 17 as the core, and the yoke layer 17 is provided on the insulating layer 26 which, together with the return yoke 16, sandwiches the coil 22. The other end 16b of the return yoke 16 is exposed to the recording surface 3a of the recording medium 3 at the air bearing surface S side, while the one end 16a of the return yoke 16 is directly connected to the yoke-layer 17. One end of the magnetic pole layer 21, i.e. the pole tip 21a, is also exposed to the recording surface 3a of the recording medium 3 at the air bearing surface S side.

Thus, when a current flows through the coil 22, magnetic flux is generated from the magnetic pole layer 21 toward the recording surface 3a of the recording medium 3. This magnetic flux passes through the recording layer 5, back layer 7 and recording layer 5 of the recording medium 3, enters the return yoke 16 and returns to the magnetic pole layer 21 through the yoke layer 17.

Also, the magnetic head 102 for perpendicular magnetic recording of this embodiment also differs from the magnetic head 2 for perpendicular magnetic recording of the first embodiment in that it has a magnetic shield 61 in the insulating layer 30 and has a yoke layer 60 between the magnetic shield 61 and magnetic pole layer 21.

With the magnetic head 102 of this embodiment as well, it is possible to adequately prevent erasure of the magnetization produced in the recording layer 5, or in other words, pole erasure, when the magnetic head 102 is used to record magnetic information in the recording layer 5 of the recording medium 3. According to this magnetic head 102, therefore, it is possible to adequately prevent erasure of magnetic information and thus increase the reliability of the Hard Disk Drive in which the magnetic head 102 is mounted.

Third Embodiment

Figure 5:
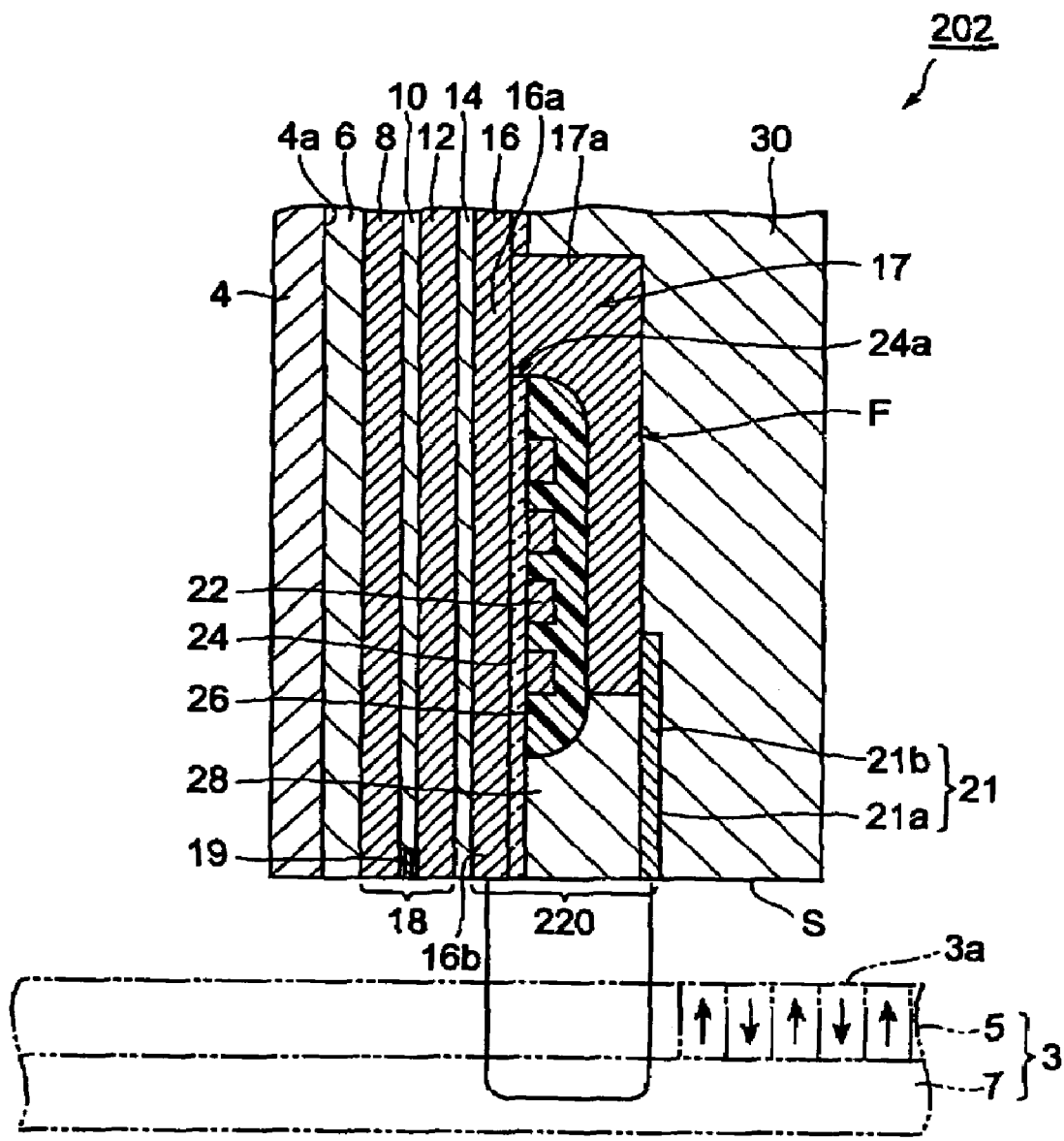
FIG. 5 is a cross-sectional view of still another embodiment of a magnetic head for perpendicular magnetic recording according to the invention.

FIG. 5 is a cross-sectional view of a third embodiment of a magnetic head for perpendicular magnetic recording according to the invention.

As shown in FIG. 5, the magnetic head 202 for perpendicular magnetic recording of this embodiment differs from the magnetic head 2 for perpendicular magnetic recording of the first embodiment in that the recording head section 220 has the construction described below.

Specifically, the recording head section 220 comprises a return yoke 16 provided on a read shield layer 12 via an insulating layer 14 on the air bearing surface S side. An insulating layer 24 is formed on the return yoke 16, and a coil 22 is provided on the insulating layer 24, with the coil 22 covered by the insulating layer 26. A yoke layer 17 is provided on the insulating layer 26. Also, an insulating layer 28 forming the flat surface F together with the yoke layer 17 is provided adjacent to the yoke layer 17 on the insulating layer 26. The magnetic pole layer 21 is formed on the flat surface F.

The coil 22 has a structure spirally wound around one end 17a of the yoke layer 17 as the core, and the yoke layer 17 is provided on the insulating layer 26 which, together with the return yoke 16, sandwiches the coil 22. The other end 16b of the return yoke 16 is exposed to the recording surface 3a of the recording medium 3 at the air bearing surface S side, while the one end 16a of the return yoke 16 is directly connected to the yoke layer 17. One end of the magnetic pole layer 21, i.e. the pole tip 21a, is also exposed to the recording surface 3a of the recording medium 3 at the air bearing surface S side. Incidentally, the magnetic pole layer 21 covers a portion of the flat surface F which is the flat surface of the yoke layer 17 (the end portion on the air bearing surface S side).

Thus, when a current flows through the coil 22, magnetic flux is generated from the magnetic pole layer 21 toward the recording surface 3a of the recording medium 3. This magnetic flux passes through the recording layer 5, back layer 7 and recording layer 5 of the recording medium 3, enters the return yoke 16 and returns to the magnetic pole layer 21 through the yoke layer 17.

With the magnetic head 202 of this embodiment as well, it is possible to adequately prevent erasure of the magnetization produced in the recording layer 5, or in other words, pole erasure, when the magnetic head 202 is used to record magnetic information in the recording layer 5 of the recording medium 3. According to this magnetic head 202, therefore, it is possible to adequately prevent erasure of magnetic information and thus increase the reliability of the Hard Disk Drive in which the magnetic head 202 is mounted.

Fourth Embodiment

A fourth embodiment of a magnetic head for perpendicular magnetic recording according to the invention will now be explained. Throughout the explanation of this embodiment, structural elements identical or corresponding to those of the first embodiment will be indicated using like reference numerals, and will not be explained again.

The magnetic head for perpendicular magnetic recording of this embodiment differs from the magnetic heads 2, 102, 202 for perpendicular magnetic recording of the first to third embodiments in that the soft magnetic material composing the magnetic pole layer 21 has a magnetostriction constant $\lambda$ of at least $10 \times 10^{-6}$ and no larger than $60 \times 10^{-6}$, with a parameter P represented formula (1) above of 0.2 or larger and less than 20.

In this case as well, it is possible to adequately prevent pole erasure when the magnetic head according to this embodiment is used to record magnetic information in the recording medium 3. With the magnetic head of this embodiment, therefore, it is possible to adequately prevent erasure of magnetic information and thus increase the reliability of the Hard Disk Drive in which the magnetic head is mounted.

In the magnetic head for perpendicular magnetic recording of this embodiment, preferably the magnetic anisotropic field Hk of the material is at least 2000 A/m and no larger than 25,000 A/m, while the stress $\sigma$ is at least 100 MPa and no larger than 1000 MPa.

If the magnetic anisotropic field Hk is less than 2000 A/m, the magnetic domain structure will tend to be more unstable than when the magnetic anisotropic field Hk is 2000 A/m or larger, while if the magnetic anisotropic field Hk is larger than 25,000 A/m, it will not be possible to sufficiently saturate the magnetic pole in the magnetic field generated by the coil, thus risking inadequate recording power, as opposed to when the magnetic anisotropic field Hk is 25,000 A/m or smaller. If the stress $\sigma$ is less than 100 MPa, the effect of the tensile stress at the pole tip 21a will be reduced, tending to occur pole erasure at the pole tip 21a, as opposed to when the stress $\sigma$ is 100 MPa or larger. If the stress $\sigma$ is larger than 1000 MPa, delamination of the pole tip 21a may occur, as opposed to when the stress $\sigma$ is 1000 MPa or smaller.

The soft magnetic material composing the magnetic pole layer 21 is not particularly restricted so long as the parameter P is larger than 0.2 and smaller than 20, and the soft magnetic material used is preferably one comprising $(Fe_XCo_{1-X})_{1-Y}A_Y$ or $(Fe_XCo_{1-X})_{1-Y}(A_WB_{1-W})_Y$.

Here, X, Y and W satisfy the following inequalities:

$0.5 \leq X \leq 1$ $0 \leq Y \leq 0.1$ $0 \leq W \leq 0.5$.

The element for A is selected from the group consisting of B, C, N, Al, Si, Ni, Cu, Zr, Hf and Ta, and the element for B is selected from the group consisting of O, N and C.

Specifically, as soft magnetic materials there may be used $Co_{0.3}Ni_{0.2}Fe_{0.5}$, $Fe_{0.95}Ni_{0.05}$, $(Fe_{0.7}Co_{0.3})_{0.95}B_{0.05}$, $(Fe_{0.7}Co_{0.3})_{0.95}$ $(Zr_{0.33}O_{0.67})_{0.05}$, $(Fe_{0.7}Co_{0.3})_{0.96}$ $(Zr_{0.33}O_{0.67})$ $Fe_{0.6}Co_{0.36}Ni_{0.04}$, or the like.

However, the element for A and the element for B may be any element besides those elements mentioned above so long as parameter P is larger than 0.2 and less than 20. In such cases as well, the pole erasure can be adequately prevented when the magnetic head 2 is used to record magnetic information on the recording layer 5 of the recording medium 3.

The present invention is not limited to the first to fourth embodiments. For example, although the entire magnetic pole layer 21 is composed of the same material in the first to fourth embodiments, the yoke section 21b and pole tip 21a of the magnetic head of the invention may be composed of different materials, so long as the parameter P is within the range specified for each embodiment.

EXAMPLES

The present invention will now be explained in greater detail through examples, with the understanding that these examples are in no way limitative on the invention.

Examples 1-6 and Comparative Examples 1-4

Each magnetic head 2 for perpendicular magnetic recording was fabricated in the following manner.

First, an insulating layer 6 made of alumina was formed on one side 4a of an AlTiC substrate ($Al_2O_3$.TiC) 4, and then a read shield layer 8 made of NiFe, an insulating layer 10 made of alumina and a read shield layer 12 made of NiFe were laminated in that order on the insulating layer 6, to form a reproduction head section 18. During the process of forming the insulating layer 10, an MR element 19 was formed with one edge exposed at the air bearing surface S side. A GMR element was used as the MR element 19.

Next, an insulating layer 14 made of alumina was formed on the reproduction head section 18, and a yoke layer 17 made of permalloy was formed in the insulating layer 14 so as to form a flat surface F. A magnetic pole layer 21 was formed on the flat surface F, and then an insulating layer 24 made of alumina was formed on the magnetic pole layer 21, with an opening formed in the insulating layer 24.

After then forming a coil 22 on the insulating layer 24, an insulating layer 26 made of a resist was formed on the coil 22.

Next, a return yoke layer 16 made of NiFe was formed on the insulating layer 26. One end 16a of the return yoke 16 was directly connected to the magnetic pole layer 21 through the hole in the insulating layer 24. Also, an insulating layer 30 made of alumina was formed on the return yoke layer 16, thereby obtaining a perpendicular magnetic recording head 2.

The thickness of the magnetic pole layer 21 was 0.25 µm, and it was composed of a pole tip 21a and yoke section 21b. The width W of the pole tip 21a was 0.12 µm, the length L of the pole tip 21a was 0.18 µm and the length/width ratio of the pole tip 21a (L/W) was 1.5.

The magnetic pole layers 21 of Examples 1, 2 and 6 and Comparative Examples 1 and 4 were formed by electrodeposition plating with the bath composition and bath conditions shown in Table 1 below.

The magnetic pole layers 21 of Examples 3-5 and Comparative Examples 2 and 3 were formed by DC magnetron sputtering under the conditions shown in Table 2 below. The sputtering method was carried out with application of a head transverse magnetic field.

TABLE 1

|  | Example 1 | Example 2 | Example 6 | Comp. Ex. 1 | Comp. Ex. 4 |
| --- | --- | --- | --- | --- | --- |
| Nickel sulfate•6H$_2$O [g/L] | 36 | 40 | 42 | 42 | 40 |
| Nickel chloride•6H$_2$O [g/L] | 8 | — | — | — | — |
| Cobalt sulfate•6H$_2$O [g/L] | 18 | 63 | 20 | 20 | 63 |
| Iron sulfate•7H$_2$O [g/L] | 4 | 25 | 22 | 22 | 25 |
| Boric acid [g/L] | 30 | 25 | 27 | 27 | 25 |
| Saccharin sodium [g/L] | 0.5 | 0.5 | 0.5 | 0.5 | 0.5 |
| Sodium laurate | 0.01 | 0.01 | 0.05 | 0.05 | 0.01 |
| Bath temperature [° C.] | 20 | 20 | 20 | 20 | 20 |
| Bath pH | 2.5 | 2.2 | 2.3 | 2.1 | 2.0 |
| Magnetic pole layer material | Co$_{0.3}$Ni$_{0.2}$Fe$_{0.5}$ | Fe$_{0.95}$Ni$_{0.05}$ | Fe$_{0.6}$Co$_{0.36}$Ni$_{0.04}$ | Fe$_{0.56}$Co$_{0.40}$Ni$_{0.04}$ | Fe$_{0.92}$Ni$_{0.08}$ |

TABLE 2

|  | Example 3 | Example 4 | Example 5 | Comp. Ex. 2 | Comp. Ex. 3 |
| --- | --- | --- | --- | --- | --- |
| Sputtering power [W] | 1500 | 1500 | 1500 | 1500 | 1500 |
| Bias power [W] | 0 | 150 | 100 | 100 | 150 |
| Ar gas pressure [Pa] | 0.08 | 0.2 | 0.2 | 0.2 | 0.4 |
| Oxygen partial pressure [Pa] | — | 0.05 | 0.05 | 0.05 | — |
| Film-forming temperature | Room temperature | Room temperature | Room temperature | Room temperature | Room temperature |
| Substrate rotation speed [rpm] | 10 | 15 | 20 | 5 | 10 |
| Magnetic pole layer material | (Fe$_{0.7}$Co$_{0.3}$)$_{0.95}$B$_{0.05}$ | (Fe$_{0.7}$Co$_{0.3}$)$_{0.95}$(Zr$_{0.33}$O$_{0.67}$)$_{0.05}$ | (Fe$_{0.7}$Co$_{0.3}$)$_{0.96}$(Zr$_{0.33}$O$_{0.67}$)$_{0.04}$ | (Fe$_{0.65}$Co$_{0.35}$)$_{0.96}$(Zr$_{0.33}$O$_{0.67}$)$_{0.04}$ | Fe$_{0.7}$Co$_{0.3}$ |

The magnetic head 2 obtained in the manner described above was used for measurement of the saturation magnetic flux Bs, magnetic anisotropic field Hk, magnetostriction constant λ, film stress σ and parameter P. The results are shown in Table 3.

(3) Magnetostriction constant (λ): The magnetostriction constant λ was determined from the displacement of the thin-film with application of a magnetic field using the optical lever method.

TABLE 3

|  | Example 1 | Example 2 | Comp. Ex. 4 | Example 3 | Example 4 | Example 5 | Example 6 | Comp. Ex. 1 | Comp. Ex. 2 | Comp. Ex. 3 |
| --- | --- | --- | --- | --- | --- | --- | --- | --- | --- | --- |
| Bs [Wb/m$^2$] | 1.8 | 2 | 2 | 2.3 | 2.1 | 2.2 | 2.3 | 2.3 | 2.1 | 2.4 |
| Hk [A/m] | 801 | 814.5 | 399.3 | 23156.5 | 11977.5 | 2395.5 | 2235.8 | 1597 | 1996.3 | 1038.1 |
| λ | 4 × 10$^{-6}$ | 9 × 10$^{-6}$ | 9 × 10$^{-6}$ | 42 × 10$^{-6}$ | 35 × 10$^{-6}$ | 32 × 10$^{-6}$ | 39 × 10$^{-6}$ | 40 × 10$^{-6}$ | 40 × 10$^{-6}$ | 44 × 10$^{-6}$ |
| δ [MPa] | 180 | 750 | 450 | 290 | 100 | 260 | 280 | 300 | 250 | 120 |
| P | 1.12 | 0.12 | 0.10 | 1.90 | 3.42 | 0.29 | 0.20 | 0.13 | 0.1996 | 0.1966 |
| Residual output signal strength (%) | 94 | 95 | 80 | 100 | 93 | 95 | 91 | 24 | 65 | 36 |
| Evaluation | ○ | ○ | x | ○ | ○ | ○ | ○ | x | x | x |

The Bs, Hk, λ, σ and parameter P values in Table 3 were measured by the following method.

(1) Saturation magnetic flux (Bs): Bs was measured using a VSM (Vibrating Sample Magnetometer). However, since measurement cannot be conducted with the magnetic head 2, a measuring sample was prepared with the bath composition and bath conditions shown in Table 1, and the Bs was determined for the measuring sample.

(2) Anisotropic field (Hk): Hk was determined from the magnetic hysteresis loop in the hard direction of magnetization, using a B-H loop tracer.

(4) Stress (σ): The stress σ was calculated by substituting different parameters into the following formula.

$$\sigma = E \cdot h_s^2 / 6(1-VS) r h_f$$

E: Young's modulus, $h_s$: Substrate thickness, VS: Poisson ratio, r: curvature radius, $h_f$: film thickness When the magnetic pole layer 21 was formed by sputtering, the magnetic pole layer was formed on a glass substrate and the warping was measured before and after film formation on the glass substrate to calculate the stress. The size of the substrate used was 10 mm×20 mm×0.2 mm (thickness).

The value of the Young's modulus E was 617 GPa, and the value of the Poisson ratio VS was 0.21.

When the magnetic pole layer 21 was formed by electrodeposition plating, a film of the magnetic pole layer 21 was formed on an AlTiC substrate and the warping was measured from the optical interference before and after film formation on the AlTiC substrate, to calculate the stress. The size of the substrate used was a 6-inch AlTiC substrate (2 mm thickness). The value of the Young's modulus E was 407 GPa, and the value of the Poisson ratio VS was 0.24.

(5) Evaluation of magnetic head for perpendicular magnetic recording

The magnetic head for perpendicular magnetic recording obtained in the manner described above was evaluated by the following method. Specifically, a 130 kFCI test signal was recorded on one 70-sector track of a perpendicular magnetic recording medium having a magnetic coercive force of 4700 Oe, the initial output was measured, and then a 50 kFCI pole erasure test signal was recorded at the head of each sector. After repeating the pole erasure test 300 times, the residual output of the test signal was calculated as the residual output signal strength (%). The results are shown in Table 3 and in FIGS. 6 and 7.

Pole erasure was defined as a residual output signal strength of 90% or less. When no pole erasure occurred, the magnetic head was evaluated as satisfactory and designated as "o" in Table 3, and when pole erasure occurred, the magnetic head was evaluated as not satisfactory and was designated as "x" in Table 3.

Figure 6:
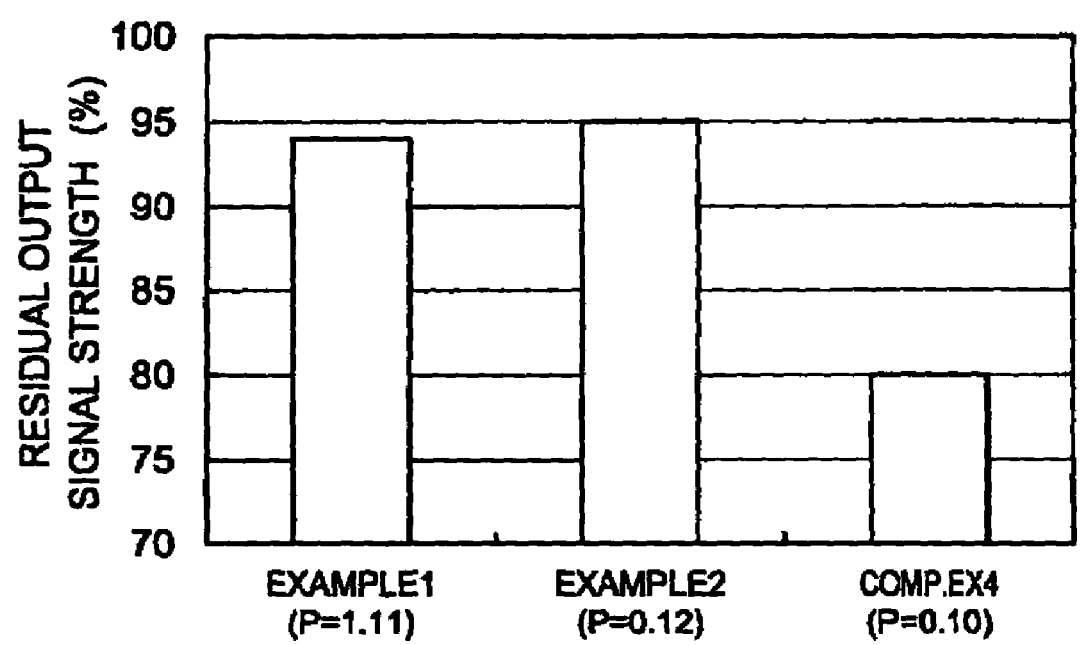
FIG. 6 is a graph showing the relationship between residual output signal strength and parameter P for magnetic heads for perpendicular magnetic recording according to Examples 1-2 and Comparative Example 4.
Figure 7:
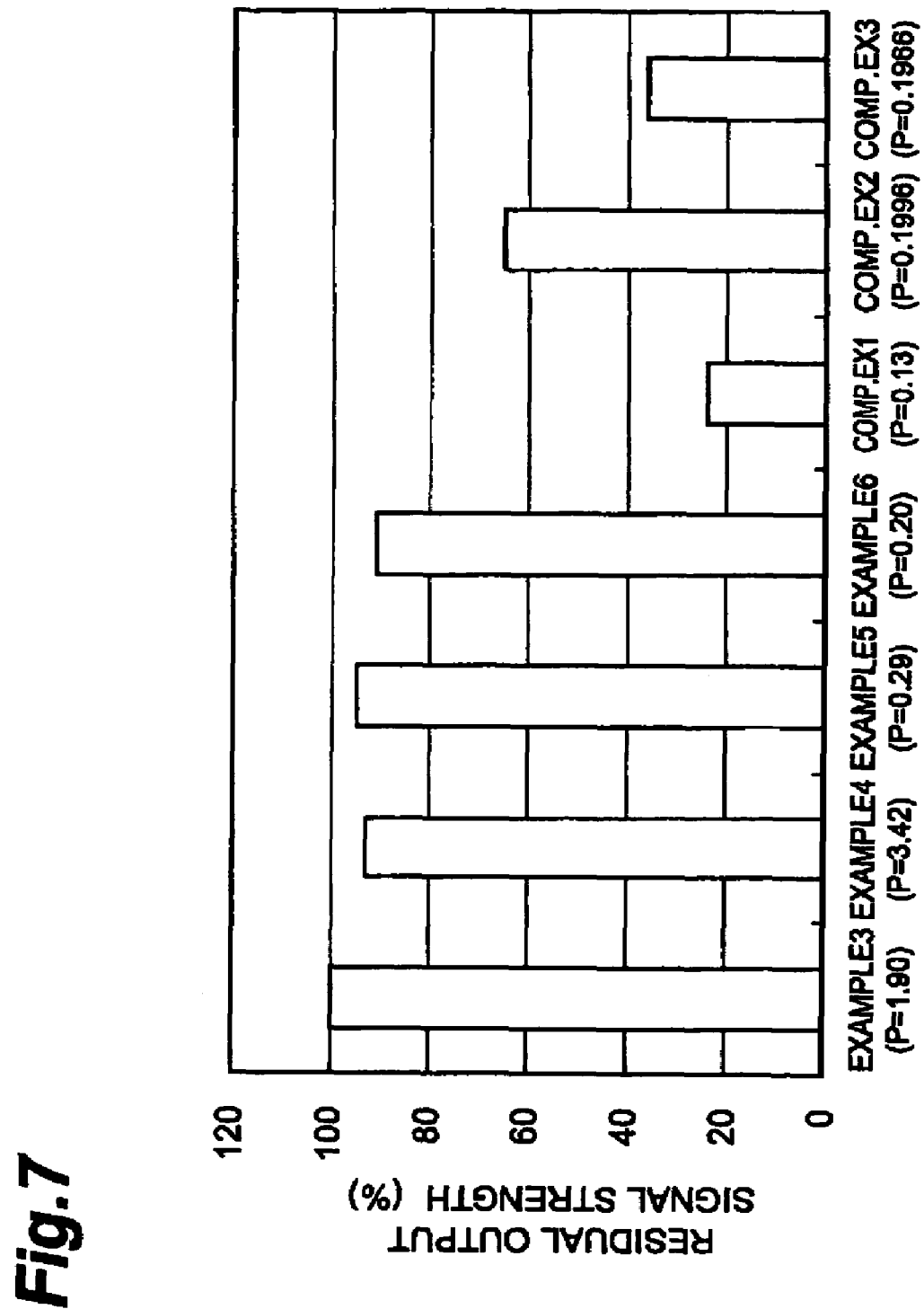
FIG. 7 is a graph showing the relationship between residual output signal strength and parameter P for magnetic heads for perpendicular magnetic recording according to Examples 3-6 and Comparative Examples 1-3.

As clearly seen from the results in Table 3 and FIGS. 6 and 7, the magnetic heads of Examples 1 and 2 had residual output signal strengths of larger than 90%, and therefore no pole erasure occurred. In contrast, the magnetic head of Comparative Example 4 had a residual output signal strength of less than 90%, and therefore pole erasure occurred.

This confirmed that pole erasure can be adequately prevented by a magnetic head wherein the material composing the magnetic pole has a magnetostriction constant $\lambda$ of less than $10 \times 10^{-6}$ and a parameter P represented by formula (1) above of larger than 0.1 and less than 200.

The magnetic heads of Examples 3 to 6 had residual output signal strengths of larger than 90%, and therefore no pole erasure occurred. In contrast, the magnetic heads of Comparative Examples 1 to 3 had residual output signal strengths of less than 90%, and therefore pole erasure occurred.

This confirmed that pole erasure can be adequately prevented by a magnetic head wherein the material composing the magnetic pole has a magnetostriction constant $\lambda$ of at least $10 \times 10^{-6}$ and no larger than $60 \times 10^{-6}$ and a parameter P represented by formula (1) above of 0.2 or larger and less than 20.

What is claimed is:

1. A magnetic head for perpendicular magnetic recording having an air bearing surface positioned facing a recording surface of a recording medium, which records magnetic information on said recording medium by generating magnetic flux toward said recording surface of said recording medium, the magnetic head comprising a magnetic pole which generates magnetic flux toward said recording surface of said recording medium, and a return yoke connected to said magnetic pole, wherein said magnetic pole has a pole tip provided at an air bearing surface side and a yoke section provided at an opposite side of said pole tip from the air bearing surface side, and wherein a material composing said magnetic pole has a magnetostriction constant $\lambda$ of at least 0 and less than $10 \times 10^{-6}$, with a parameter p represented by:

$$P = \frac{H_k}{\left(\frac{|\lambda|}{10^{-6}}\right) \times |\sigma|}, \quad (1)$$

wherein Hk represents a magnetic anisotropic field of the material (units: A/m), $\sigma$ represents a stress of the material (units: MPa), $\lambda$ represents a magnetostriction constant of the material, P is larger than 0.1 and less than 200, and the magnetic anisotropic field Hk of said material is greater than 1401 A/m and no larger than 20,000 A/m.

2. A magnetic head for perpendicular magnetic recording according to claim 1, wherein the stress $\sigma$ is at least 100 MPa and no larger than 1000 MPa.

3. A magnetic head for perpendicular magnetic recording having an air bearing surface positioned facing recording surface of a recording medium, which records magnetic information on said recording medium by generating magnetic flux toward said recording surface of said recording medium, the magnetic head comprising a magnetic pole which generates magnetic flux toward said recording surface of said recording medium, and a return yoke connected to said magnetic pole, wherein said magnetic pole has a pole tip provided at an air bearing surface side and a yoke section provided at an opposite side of said pole tip from the air bearing surface side, and wherein material composing said magnetic pole has a magnetostriction constant $\lambda$ of at least $10 \times 10^{-6}$ and no larger than $60 \times 10^{-6}$ with a parameter P represented by:

$$P = \frac{H_k}{\left(\frac{|\lambda|}{10^{-6}}\right) \times |\sigma|}, \quad (1)$$

wherein Hk represents the magnetic anisotropic field of the material (units: A/m), $\sigma$ represents the stress of the material (units: Mpa), $\lambda$ represents the magnetostriction constant of the material, P is 0.2 or larger and less than 20, and the magnetic anisotropic field Hk of said material is at least 2000 A/m and no larger than 25,000 A/m.

4. A magnetic head for perpendicular magnetic recording according to claim 3, wherein the stress $\sigma$ is at least 100 MPa and no larger than 1000 MPa.

5. A magnetic head for perpendicular magnetic recording according to claim 1, wherein a saturation flux density at said magnetic pole is 1.5 (Wb/m$^2$) or larger.

6. A magnetic head for perpendicular magnetic recording according to claim 1, wherein said magnetic pole is fixed on a flat plane, and a thickness of said magnetic pole is 0.15-0.4 µm.

7. A magnetic head for perpendicular magnetic recording according to claim 1, wherein a ratio of a width W of said pole tip determining a track width and a length L along a direction perpendicular to the air bearing surface of said pole tip (L/W) is at least 0.5 and no larger than 3.

8. A magnetic head for perpendicular magnetic recording according to claim 1, wherein a ratio of a maximum width YW at said yoke section and a maximum length YL along a direction perpendicular to the air bearing surface of said magnetic pole (YL/YW) is at least 0.33 and no larger than 3.

9. A magnetic head for perpendicular magnetic recording according to claim 1, wherein a 180° domain wall at said yoke section is parallel to said air bearing surface.

10. A magnetic head for perpendicular magnetic recording according to claim 1, wherein a material composing said magnetic pole comprises $(Fe_XCo_{1-X})_{1-Y}A_Y$ or $(Fe_XCo_{1-X})_{1-Y}(A_WB_{1-W})_Y$, where X, Y and W satisfy:

$0.5 \leq X \leq 1$ $0 \leq Y \leq 0.1$ $0 \leq W \leq 0.5$, wherein a first element for A is selected from a first group consisting of B, C, N, Al, Si, Ni, Cu, Zr, Hf and Ta, and wherein a second element for B is selected from a second group consisting of O, N and C.

11. A magnetic head for perpendicular magnetic recording according to claim 10, wherein the material composing said magnetic pole is one from among $Co_{0.3}Ni_{0.2}Fe_{0.5}$, $Fe_{0.95}Ni_{0.05}$, $(Fe_{0.7}Co_{0.3})_{0.95}B_{0.05}$, $(Fe_{0.7}Co_{0.3})_{0.95}(Zr_{0.33}O_{0.67})_{0.05}$, $(Fe_{0.7}Co_{0.3})_{0.96}(Zr_{0.33}O_{0.67})_{0.04}$ and $Fe_{0.6}Co_{0.36}Ni_{0.04}$.

12. A magnetic head for perpendicular magnetic recording according to claim 3, wherein a saturation flux density at said magnetic pole is 1.5 (Wb/m$^2$) or larger.

13. A magnetic head for perpendicular magnetic recording according to claim 3, wherein said magnetic pole is fixed on a flat plane, and a thickness of said magnetic pole is 0.15-0.4 μm.

14. A magnetic head for perpendicular magnetic recording according to claim 3, wherein a ratio of a width W of said pole tip determining a track width and a length L along a direction perpendicular to the air bearing surface of said pole tip (L/W) is at least 0.5 and no larger than 3.

15. A magnetic head for perpendicular magnetic recording according to claim 3, wherein a ratio of a maximum width YW at said yoke section and a maximum length YL along a direction perpendicular to the air bearing surface of said magnetic pole (YL/YW) is at least 0.33 and no larger than 3.

16. A magnetic head for perpendicular magnetic recording according to claim 3, wherein a 180° domain wall at said yoke section is parallel to said air bearing surface.

17. A magnetic head for perpendicular magnetic recording according to claim 3, wherein a material composing said magnetic pole comprises $(Fe_XCo_{1-X})_{1-Y}A_Y$ or $(Fe_XCo_{1-X})_{1-Y}(A_WB_{1-W})_Y$, where X, Y and W satisfy:

$0.5 \leq X \leq 1$ $0 \leq Y \leq 0.1$ $0 \leq W \leq 0.5$, wherein a first element for A is selected from a first group consisting of B, C, N, Al, Si, Ni, Cu, Zr, Hf and Ta, and wherein a second element for B is selected from a second group consisting of O, N and C.

18. A magnetic head for perpendicular magnetic recording according to claim 17, wherein the material composing said magnetic pole is one from among $Co_{0.3}Ni_{0.2}Fe_{0.5}$, $Fe_{0.95}Ni_{0.05}$, $(Fe_{0.7}Co_{0.3})_{0.95}B_{0.05}$, $(Fe_{0.7}Co_{0.3})_{0.95}(Zr_{0.33}O_{0.67}))_{0.05}$, $(Fe_{0.7}Co_{0.3})_{0.96}(Zr_{0.33}O_{0.67})_{0.04}$ and $Fe_{0.6}Co_{0.36}Ni_{0.04}$.

\* \* \* \* \*